(12) United States Patent
Nysewander et al.

(10) Patent No.: US 10,540,362 B2
(45) Date of Patent: Jan. 21, 2020

(54) DATABASE, DATA STRUCTURE AND FRAMEWORK TRANSFORMER APPARATUSES, METHODS AND SYSTEMS

(71) Applicant: FMR, LLC, Boston, MA (US)

(72) Inventors: Melissa Christine Nysewander, Chapel Hill, NC (US); Robert L. Virgile, Lexington, MA (US); Alexis Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 386 days.

(21) Appl. No.: 14/522,576

(22) Filed: Oct. 23, 2014

(65) Prior Publication Data

US 2016/0103897 A1 Apr. 14, 2016

Related U.S. Application Data

(60) Provisional application No. 62/062,712, filed on Oct. 10, 2014.

(51) Int. Cl.
*G06F 16/25* (2019.01)
*G06F 16/2455* (2019.01)
*G06F 16/242* (2019.01)

(52) U.S. Cl.
CPC ........ *G06F 16/254* (2019.01); *G06F 16/2428* (2019.01); *G06F 16/2456* (2019.01)

(58) Field of Classification Search
CPC ............... G06F 17/30398; G06F 16/2456
See application file for complete search history.

(56) References Cited

U.S. PATENT DOCUMENTS

| | | | | |
|---|---|---|---|---|
| 5,455,945 A | * | 10/1995 | VanderDrift | G06F 17/30554 |
| 9,158,811 B1 | * | 10/2015 | Choudhary | G06F 9/542 |
| 2002/0010695 A1 | * | 1/2002 | Kearsey | G06F 17/30398 |
| 2003/0018644 A1 | * | 1/2003 | Bala | G06F 17/246 |
| 2003/0115207 A1 | * | 6/2003 | Bowman | G06F 17/30398 |
| 2006/0253466 A1 | * | 11/2006 | Upton, IV | G06F 17/30398 |

* cited by examiner

*Primary Examiner* — William Spieler
(74) *Attorney, Agent, or Firm* — Hanchuk Kheit LLP; Walter G. Hanchuk

(57) ABSTRACT

The Database, Data Structure and Framework Transformer Apparatuses, Methods and Systems ("DDSFT") transforms variable list request, population selection, base table transform extract data inputs via DDSFT components into transformed, merged data outputs. The DDSFT includes a database structure that stores data used in the framework operations. A macro-tool includes one or more macros that control a sequence of database queries that extract the data from the database structure and then perform transformations on the extracted data. The macro-tool includes a series of binary flags indicative of whether or not statements are executed.

5 Claims, 6 Drawing Sheets

Fig.1: DDSFT—Datagraph

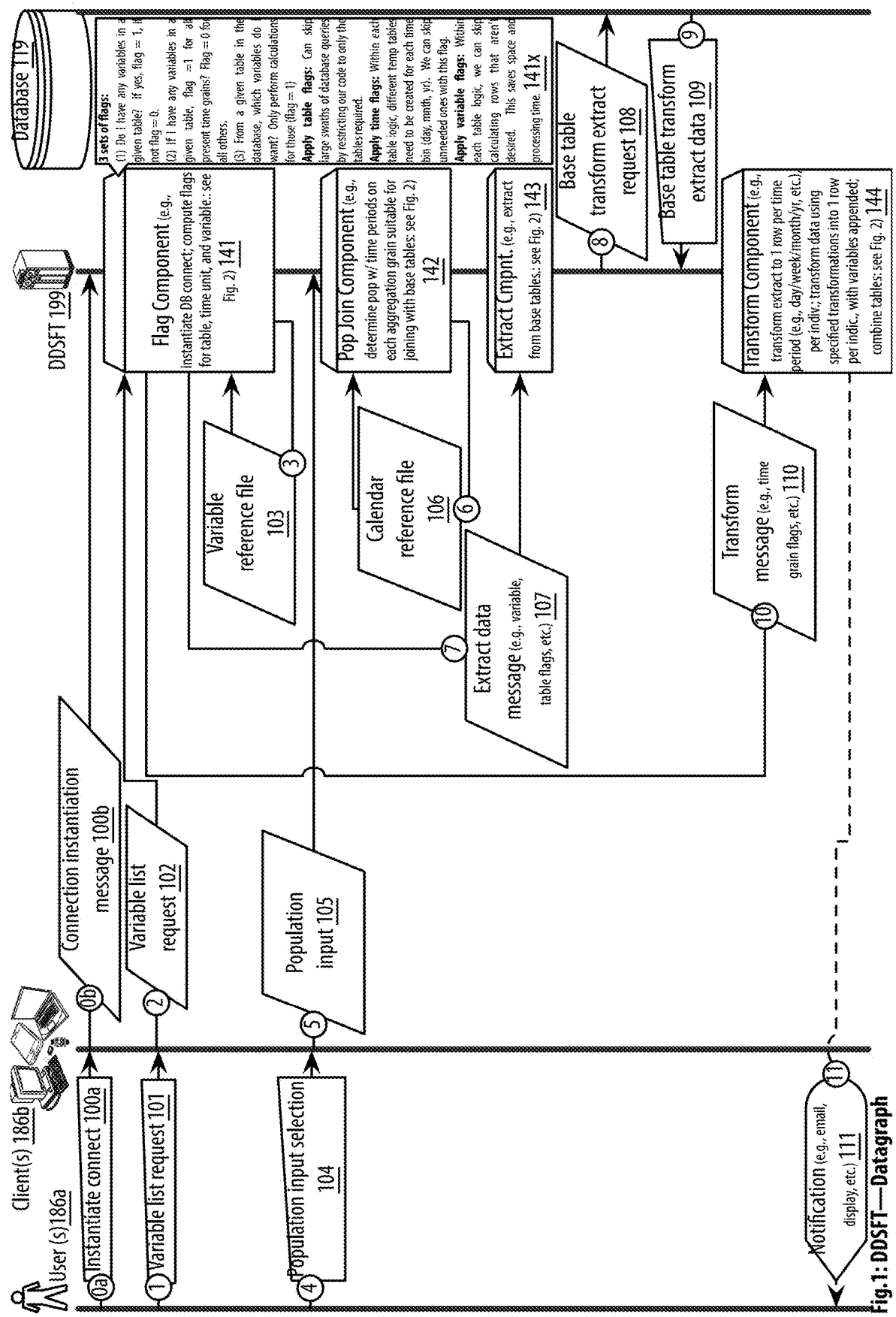
Fig. 1: DDSFT—Datagraph

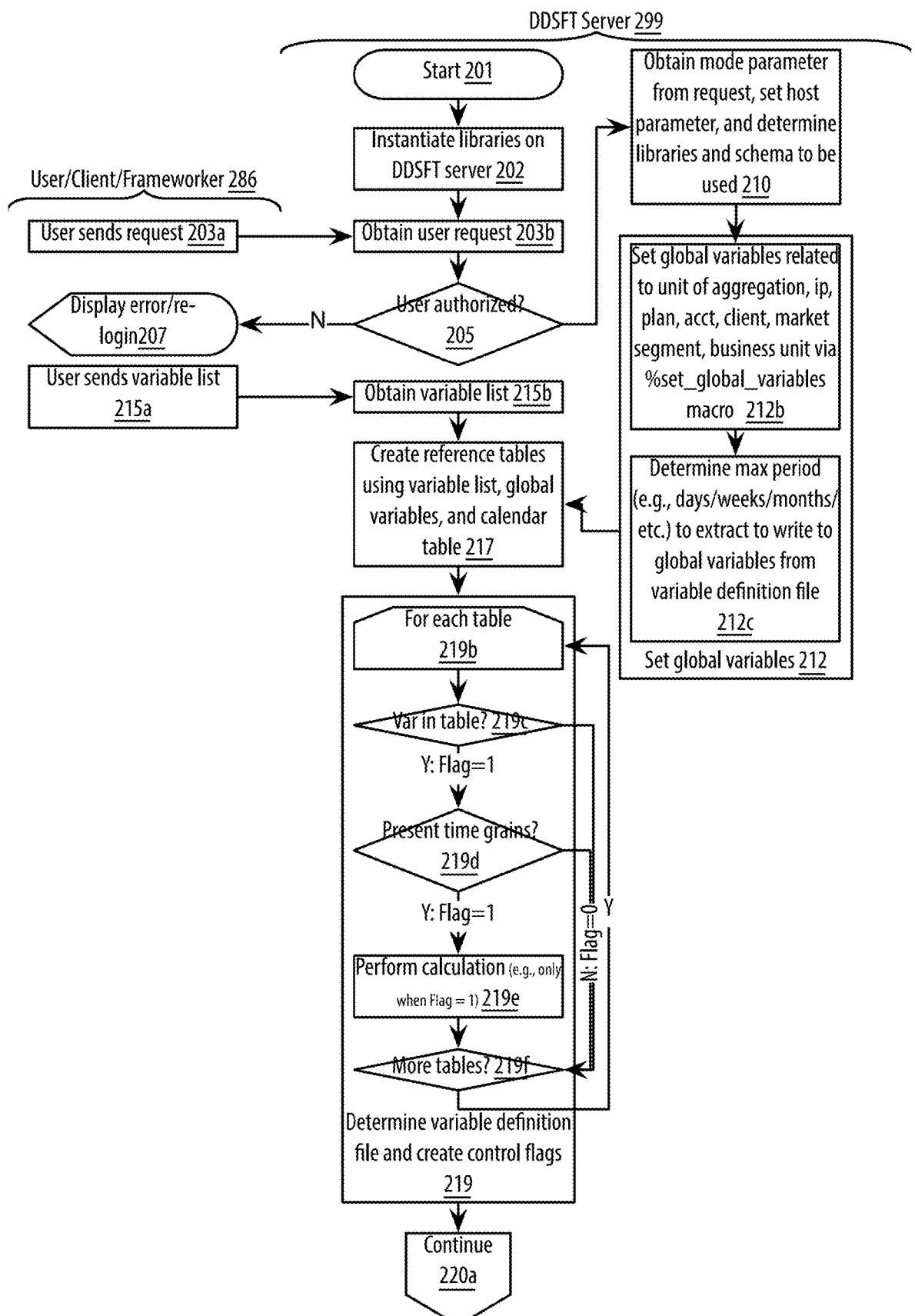
Fig.2a: DDSFT—DDSFT (and Flag sub) Component(s) Logic Flow

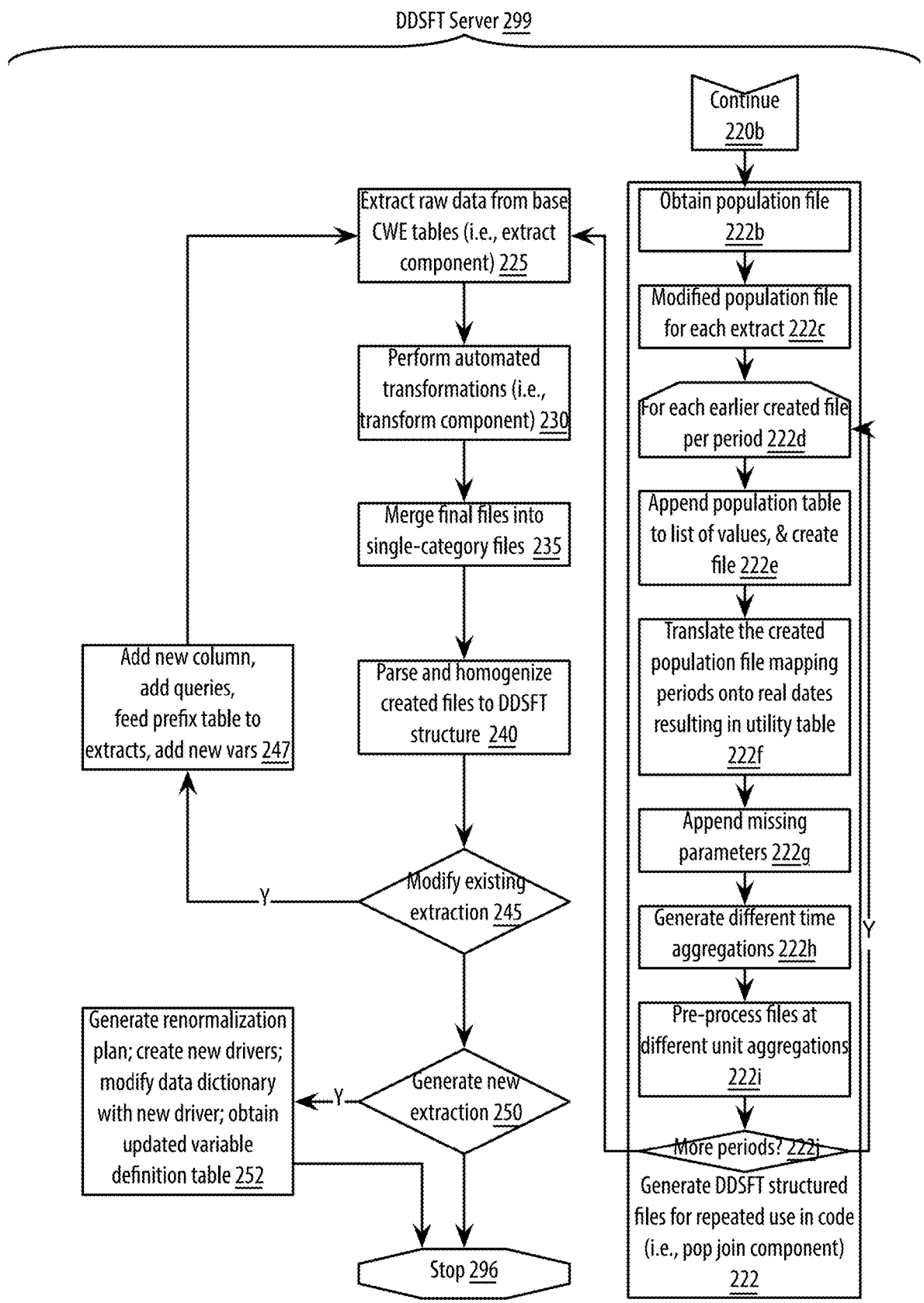
Fig.2b: DDSFT—DDSFT (and Pop Join, Extract, and Transform sub) Component(s) Logic Flow

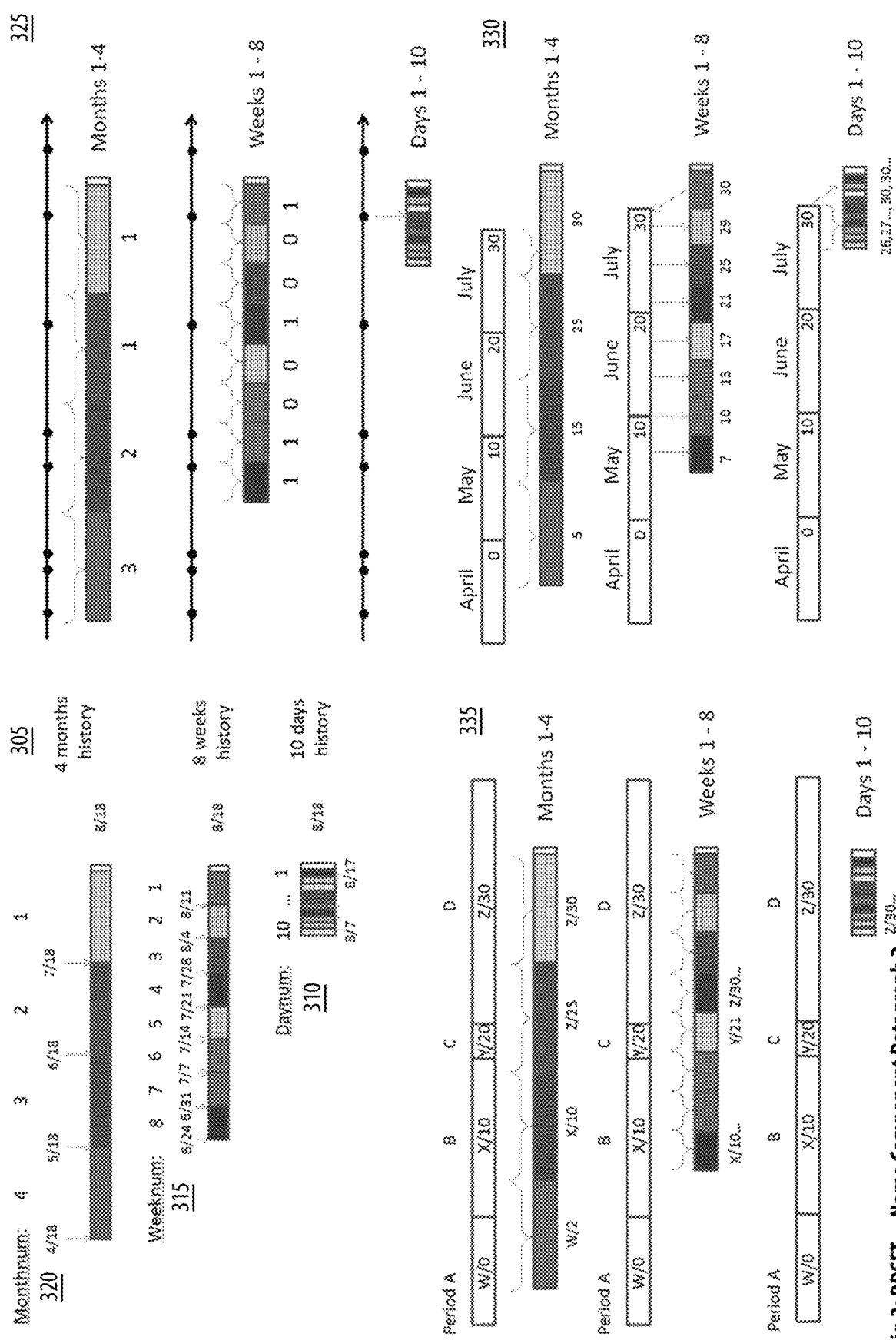
Fig.3: DDSFT—Name Component Datagraph 2

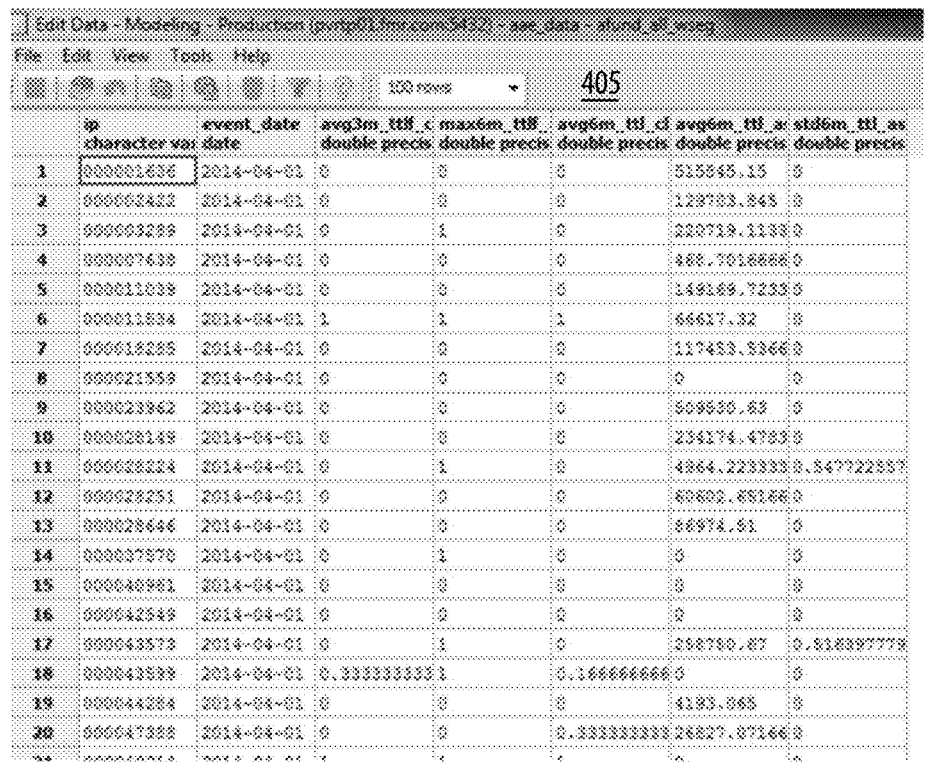
Fig.4: DDSFT—Screenshot

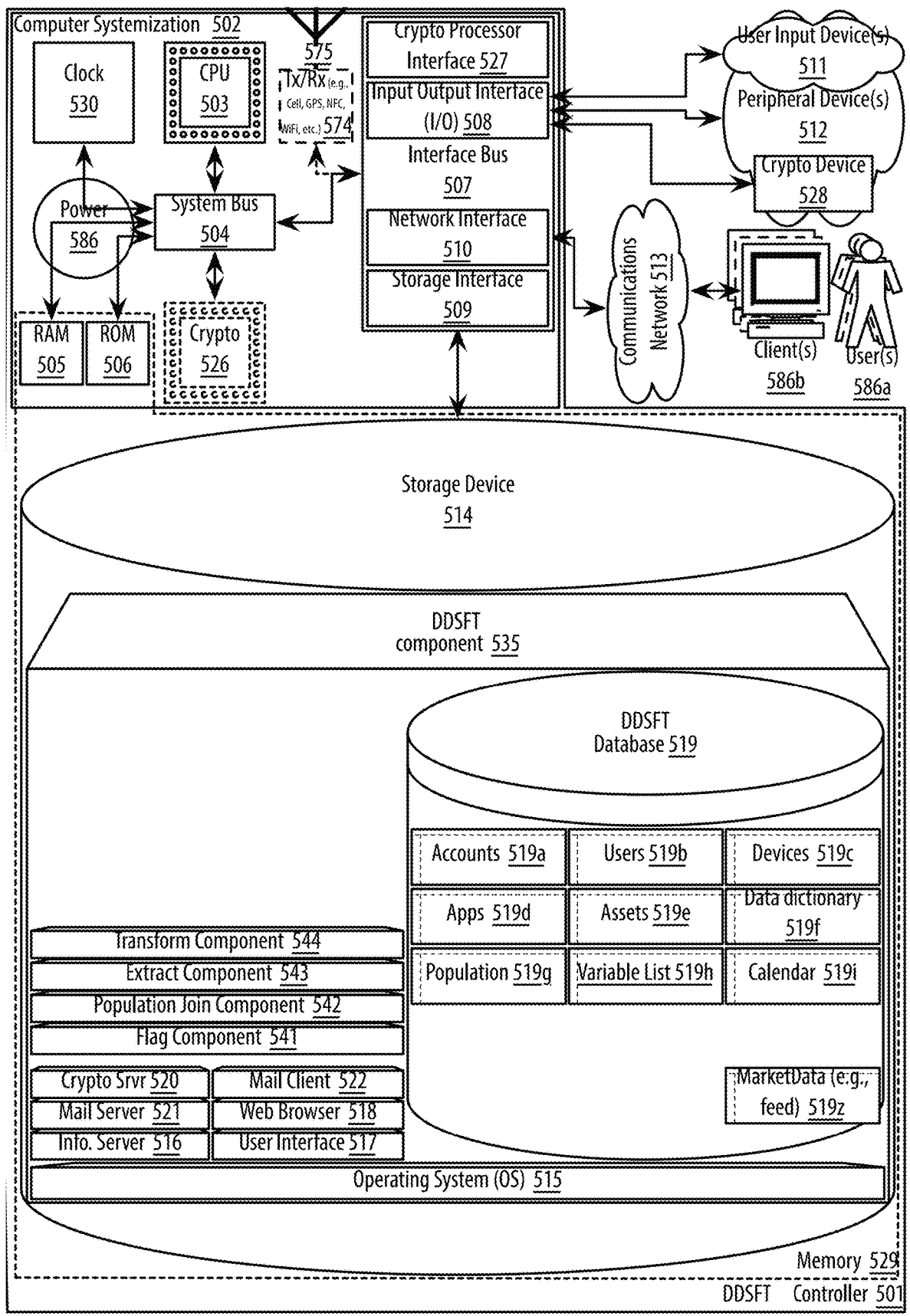
Fig.5: DDSFT—Controller

DATABASE, DATA STRUCTURE AND FRAMEWORK TRANSFORMER APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/062,712, filed Oct. 10, 2014, entitled "Database, Data Structure and Framework Transformer Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address database information technology, and more particularly, include Database, Data Structure and Framework Transformer Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Databases and information systems may be used to store data. Database designers often use and create relational databases where a number of tables inter-relate to one another via key fields. For example, a key field for a user's telephone number may be used to look up their address in one table, while looking up their order for a product in another table. Ad users store more and more information in a database, the database may be searched and export information that may be used to meter various statistics.

BRIEF DESCRIPTION OF THE DRAWINGS

Appendices and/or drawings illustrating various, non-limiting, example, innovative aspects of the Database, Data Structure and Framework Transformer Apparatuses, Methods and Systems (hereinafter "DDSFT") disclosure, include:

FIG. 1 shows a datagraph diagram illustrating embodiments of the DDSFT;

FIGS. 2a and 2b show a logic diagram illustrating embodiments of DDSFT component(s) for the DDSFT;

FIG. 3 shows a block diagram illustrating embodiments of a extraction mappings for the for the DDSFT;

FIG. 4 shows a screenshot diagram illustrating embodiments of a variable table for the DDSFT; and FIG. 5 shows a block diagram illustrating embodiments of a DDSFT controller;

APPENDIX 1 illustrates embodiments of a data dictionary of the DDSFT.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Database, Data Structure and Framework Transformer Apparatuses, Methods and Systems (hereinafter "DDSFT") transforms variable list request, population selection, base table transform extract data inputs, via DDSFT components (e.g., flag, population join, extract, transform components, etc.), into transformed, merged data outputs. The DDSFT components, in various embodiments, implement advantageous features as set forth below.

Introduction

One of the advantages of the DDSFT is to generate transformable framework ready data, which allows non-database experts to readily engage with and make use of disparate database data through orthogonal transformation mechanics without having to be experts in database mining/programming. The DDSFT shortens the time and reduces the need for users to write custom database code by allowing users to (1) select variables of interest (e.g., total number of trades performed in a day), (2) select an aggregation for a given population (e.g., people/region/demographics/etc.), (3) over a specified date range, and a (4) specified number of transformations (e.g., standard deviation, average, etc.), and the DDSFT will automatically go and retrieve this information over the specified ranges. This allows a user (i.e., modeler/frameworker) who has little expertise with databases to use the standardized, vetted DDSFT constructs to choose the variables and ranges they would like to develop frameworks for analysis. The data output from the DDSFT may be actionable (e.g., engaging in transactions, issuing payments, requesting advertising, ordering inventory, etc.) based on specified user thresholds based on the DDSFT transformed framework data output.

The orthogonality of the DDSFT means that, unlike existing systems, users may transform variables without having to code/generate a high number of specific variables (e.g., rather than making a variable representing sales over September, and another representing average sales over September, and another variable representing the standard deviation over September—i.e., they generally look at monthly snapshots that are static and generally inoperable to transformations), the DDSFT may have a variable for sales, and then apply transformations over specified periods orthogonally. In one embodiment, selected variables are flagged in such a way to generate execute statements that pull in appropriate command snippets (e.g., macro) language (e.g., table selects, joins, storage, updates, etc.) that builds up an orthogonal SQL query appropriate the users request.

As such, the DDSFT provides an API for non-database experts to access data through variables, ranges, and transform the data in their database(s) per their needs.

The DDSFT may include independent variables (e.g., variables used to build framework, number of trades, calls to the company, demographics, age, income, etc.) and dependent variables (e.g., computed variables of what a user wants to predict from independent variables, does a user switch providers, etc.). The variables provide a 'menu' that will automatically map to any number of databases and users may select those variables and the contexts of use (e.g., period of time, population, transformation, etc.) and the DDSFT will properly gain access to the proper data in a desired database without the user having to write custom code to gain proper access. As such, the DDSFT allows a user to select a variable, context and transformation to issue the proper call/mapping to the desired database. As such, the DDSFT is a front end for frameworking big data, engaging with massive databases that contain huge numbers of different types of variables, and with a single request, allows a user to flexibly request anything they want (e.g., from a variable list), across a context and apply a transformation to the results of that request.

DDSFT

FIG. 1 shows a datagraph diagram illustrating embodiments of the DDSFT. In one embodiment, the DDSFT may operate through a DDSFT server 199 having access to a DDSFT accessible database 119 and is accessible by users 186 through a variety of client devices 186b.

Establishing a Database Connection

In one embodiment, the DDSFT may establish connection with a database 100a. An example setup connection 100b, substantially in the form of a SAS formatted option commands is provided below:

```
/*SAS options that enable HPA Server functions*/
%let uid = your_DDSFT_user_id;
/*SSH authentication for the database and for HPA Server*/
options set=TKSSH_USER="&uid";
options set=TKSSH_IDENTITY="/home/&uid./.ssh/id_rsa";
/*declare which DDSFT server is HPA-enabled, and location of the SAS HPA
libraries*/
%let HPAHost=pvrtp01.fmr.com;
%let HPAPath=/opt/SASHPA/TKGrid;
option set=GRIDHOST="&HPAHost";
option set=GRIDINSTALLLOC="&HPAPath";
/*direct SAS to use in-database processing for implicit passthru*/
options dbidirectexec;
/*PVRTP01 specifies the Production-Frameworking server, other servers can be
/*specified by using PVRTP02/Production-Scoring, or PVRTP03/Non-production
```

Create a Population Table

It should be noted that the creation of a population table 104, 105 and a variable list 101, 102 may be done in the order of a user's preference. For ease of discussion, we will jump out to population table creation first. Details follow for allowing a user to select a population for input 104 and providing that input selection as a message 105 to the DDSFT server's 199 pop join component 142 for processing.

A population table may include two columns, an identifier and a date. This table should be stored as a DDSFT population table in an individual's working directory. The first column may be titled with the type of identifier corresponding to those to the primary keys in the database. For this example, these can be acct_id, ip, plan_id, client_id_nbr, dc_market_segment_cd, or business_unit.

The second column may be named date, and may contain the date of the event, specific to each unit. This date column may be in the date. The dates here, should match the format in the raw data tables in the DDSFT or any other connecting database's format.

To create time series or panel data, the DDSFT creates an input table with multiple rows per individual, each with a unique date. Portion of an ip, date input population file follows:

|    | Ip<br>Character (9) | date<br>date |
|----|---------------------|--------------|
| 1  | 167824301           | 2012 Jun. 23 |
| 2  | 012937543           | 2011 Aug. 1  |
| 3  | 012937543           | 2012 Jun. 4  |
| 4  | 026851025           | 2011 Jul. 1  |
| 5  | 008538218           | 2011 Jul. 4  |
| 6  | 035849556           | 2011 Apr. 22 |
| 7  | 035849556           | 2012 Feb. 1  |
| 8  | 024219974           | 2011 Jul. 6  |
| 9  | 002783313           | 2011 May 9   |
| 10 | 007679130           | 2011 Jun. 30 |
| 11 | 007679130           | 2011 Oct. 3  |
| 12 | 176254051           | 2012 Jan. 6  |
| 13 | 012204793           | 2011 Jun. 11 |
| 14 | 030152337           | 2011 Sep. 22 |

Create a Variable Definition List

In this example, a user may provide access to a database schema where the DDSFT may work, for example, the setup connection may be done in a personal, user schema. The above setup connection 100a, 100b will internally create a library based on this schema name, e.g., in this example, the setup connection creates 6 internal libraries (i.e., WIMRD, PWIMRD, MDBMRD, COMMRD, SHAMRD, and WORKING), which it then clears at the end of the run via a first executed DDSFT component, e.g., via the flag component 141, 541 of FIG. 5. As such, per this example, one should avoid using these names in the user's libraries/code, else errors may occur.

As already discussed with regard to the population input messages 104, 105, the user may supply variable list request 101 and population input selection 104 inputs in any order. Here, the user may now provide a variable list request 101 which may be provided to the DDSFT 199 via a variable list request message 102. The variable list requests may be provided 102 to the DDSFT server's 199 flag component 141, which after instantiation of itself (and any other processing components 142, 143, 144, etc.) may use the variable lists to compute flags 141.

It should be noted that the user may select from among thousands of variable drivers, which may be provided via data dictionary. Examples of the data dictionary may be found in Appendix 1 in the form of an Excel workbook. Creatable drivers may be found in the driver worksheet, while possible transformations to be used on raw variables may be found on the transformation worksheet. Transformations are optional. If no transformation is asked for, then the DDSFT may use the most recent daily value. So, for example, this makes sense for age or marital status analysis, but may not make as much sense for total number of trades on the market when you may want to aggregate trades over some time period. Appendix 1 includes examples of: base tables (see page 1), drivers (see pages 2-26), transformations (see page 27), lookup tables (see page 28), industry codes (see page 29), call resources (see page 30), campaign codes (see pages 31-57), kit codes (see pages 58-63), market daily (see pages 64-161), and formulas for all the above worksheets (see pages 162-180). All but the first three worksheets give more information to the analyst to understand the fundamental properties of the specific example of data presented here.

These drivers are based from any number of tables in the DDSFT database, and be grouped into a number of categories for ease of reference. Each category corresponds to base tables in the DDSFT database. Example drivers/categories may include:

1. Wealth: Draws overall brokerage and workplace asset data, along with purchased total wealth data.
2. Geography: Combines the address information in one table with zip code information in another table to yield regional and proximity to branch information.
3. Weekly PASW: This table looks at two tables to show weekly interaction data collected about PASW participants.
4. Enrollment PASW: This contains information derived from three tables about PASW enrollments.
5. My Plan: This table presents data collected about Fidelity's My Plan options presented to users.
6. Calls: This table contains all inbound calls from participants, including duration, reasons, and responding business units.
7. Market: This code uses a custom, non-CWE table that contains broad economic indicators and market information such as Dow Jones, S&P 580, and VIX indices.
8. Monthly plan: This pulls information a table that has data on plan-level asset and participant interaction attributes.
9. Plan fund: This table goes deeper into the plan-level asset attributes, joining information from two tables to look at plan assets by fund type.
10. Transactions: This table looks at the number and amount of different types of transactions by transaction codes (e.g. adjustments, dividends, interest, etc.).
11. Withdrawals: This table pulls data about withdrawals, including reasons for withdrawals.
12. Contact: This table joins the main contact table with five lower-level dimensional tables to tabulate information about the total number and types of EM & OD contacts an individual has with Fidelity.
13. Account fund: The account fund table joins two tables to present information about the types of asset an individual owns.
14. Individual Session quiz: This table presents data from a table that contains summary information about online quiz sessions.
15. Target-Asset-Mix quiz: This table contains goal, tool, and TAM information gathered during online guidance, as found in three tables.
16. PWI Individual: This table presents individual-level information contained in a single table that spans both brokerage and workplace investing.
17. WI Individual: This table presents information about individuals that is contained in the workplace individual table.
18. Loan: This table presents loan information.
19. Loan detail: This table delves deeper into loan balances and payments.
20. Account: This is the main account detail table, and includes additional information about enrollments.
21. Deferral: This table contains deferral rates by types of account for all individuals.
22. NDT: This table contains information about individuals included in Non-Discrimination Testing.
23. Monthly Account: This table presents monthly information about account balance and interaction with Fidelity.
24. Plan: This table pulls data from the main plan table to present information about an individual's plan options.
25. Rollover: This table pulls rollover information (e.g. destination, type, etc.) about participants' rollover activities.

The flag component 141 may join the user supplied variable definition file 102 with a generated variable reference table 103 to create a table with the table/element flag name and a column that is binary true, e.g., 1, if a variable is present in the users file. As such, the flag component will compute flags for tables, time units and variables.

With flags set, 141, and population 105 and variable lists 102 available, the population join component 142, 542 of FIG. 5 may then determine populations within specified time periods for each aggregation grain suitable for joining with base tables 142. In so doing, the DDSFT may use a self generated calendar reference table file 106. The calendar table 106 may be used to circumvent some of the difficulties involved in working with dates in-database. For example, SAS has very specific ways it wants to work with dates, and many of these ways involve out-of-database operations; by using this reference table, it circumvents SAS's need to transform dates from one format to another, and allows the code to be created using on very basic date functions and comparisons. As such, the DDSFT may create files (e.g., unit_daynum, unit_weeknum, unit_monthnum, etc.) appending the supplied population table (e.g., units and event dates) to the list of values. These files are useful in many places where a user may want to extract only the desired days, weeks, or months from a given table. For example, the DDSFT may use the unit_dates table to take the population file (e.g., unit and event date), along with the number of days, weeks, and months, and translates this into a large utility table that maps the days, weeks, and months onto real dates. The logic for the all_dates file depends on the type of unit aggregation used. This file takes the main population file and appends missing needed parameters. The library joins the base tables in the primary database using the main primary keys of the data tables.

The DDSFT may make base table request 108 via SQL queries of the DDSFT and/or desired databases 119 and use the results to build aggregation tables and/or extracted tables for transformation 109. Upon aggregating any number of population data across different times 142, the DDSFT may use these generated aggregations of variables and table flags 107, 142 for extraction by way of the extraction component 143, 543 of FIG. 5. For example, the following three may be used in extracts from monthly base tables. Unit_month_interp is a complicated query that takes the unit_ dates table and determines the overlap between the months (e.g., one month previous to event date) and calendar dates. Weights may be used in translating calendar monthly data to a more flexible monthly convention that can start mid-month. Unit_day_interp is a simpler version of the month file, and it may create values to interpolate monthly tables onto a single day within the month. Unit_week_interp is nearly identical to the above day file, except it only calculates values for days in the middle of the week (mod (daynum,7)=4). When joining to monthly files, this is identical to calculating the value for each individual day and aggregating over all. Similar files exist for when, instead of using a monthly base table, a table that can be updated daily is employed. These files (unit_month_update, unit_week_update, and unit_day_update) all are based on row effective and row expiration dates. Here, we create files that have the start and end of the week and month. These files will be used later to determine how many days from each period lie within each week and month. Because these start and end dates are specific to each row in each base table, this is the only pre-processing we can do at this stage for this type of aggregation.

Upon extracting the desired base tables 143, 108, 109, the DDSFT provides the results to the transform component 144, 544 of FIG. 5 which also obtains an internally generated transform message 110 (e.g., having time grain flags generated earlier by the flag component 141). The transformation features themselves may be kept separate from the transformation automation logic. Each transformation may an input table with one row per time unit, for each unit/event date combination. It performs its calculation on this table, grouping by unit and event date to output a single row for each individual. As such, the transformation component 144 may transform the extracts to 1 row per time period and then, transform the desired data using the specified transformations into 1 row per individual with variables appended 144. Once the transformation component finishes 144, a notification 111 may be provided to the user (e.g., email, display output, etc.).

It should be noted that addition to the variable drivers, there are also a number of transformations that can be performed. These transformations can be performed over any period of time, in units of days, weeks, months, years, on demand, continuously, etc. Example transforms include:
1. Average (avg): The average over the period indicated
2. Minimum (min): The minimum value that appears over the period indicated
3. Maximum (max): The maximum value that appears over the period indicated
4. Standard Deviation (std): The standard deviation over the period indicated
5. Coefficient of Variation (cov): The coefficient of variation over the period indicated
6. Trend (trd): A linear fit to the data in the period indicated
7. Difference (dif): This transformation provides both the absolute difference and percent difference between the first and last occurrence over the period
8. Change (chg): Indicates whether or not a variable changed between the first and last occurrence over the period, and the sign of that change (+1, −1, 0)
9. Sum (sum): The sum of the aggregated observations over the period indicated
10. Cadence (cad): The average lag in days between consecutive events. If the time period is weekly or monthly, events will first be aggregated to that level and then the lag will be converted into days. The cadence algorithm does not deal well with sparsely populated data, so the analyst should use with caution. If 0-1 events occur, no lag can be calculated and the result will be null. If two events occur, then the lag will simply be the time between those two events, no matter the lag before or after the first or last event (e.g. if events happen on days 8, 9 of a 20-day time period, the cadence will be 1, even though the true average event-lag must be far greater).

To specify these drivers, a user may create a four-column table that contains all needed information, which may include:
1. Variable_name: The name of the variable contained in the data dictionary
2. Transformation: The transformation desired (avg, min, max, etc.). If no transformation is desired, the enter "none". Not all variables, such as distance to nearest branch, or marital status, require transformations (although the chg transformation could be useful in these cases).
3. Time_period: The number of time periods over which to calculate the transformation. If no transformation is desired, enter 0.
4. Time_unit: The time unit over which to calculate the transformation: day, week, or month. If no transformation is desired, enter 0. The following example creates a sample variable definition file.

This table may also be stored as a DDSFT table and be located in the working directory. An example command below may be used to creates an example variable definition file 101 is shown below:

```
proc sql; drop table a517200.wi_mrd_monthly_vars; quit;
data a517200.wi_mrd_monthly_vars;
    Length variable_name $ 15 transformation $ 4 time_unit $ 5;
    Input variable_name $ transformation $
    time_period time_unit $;
    Datalines;
AFF_COARSE none 0 0
AGE none 0 0
YR_SYS_SETUP none 0 0
camp_state avg 1 month
chn_orgn_dc avg 1 month
chn_orgn_fesco avg 1 month
cnt_txn_treg_num avg 1 month
ctrb_freq_num avg 3 month
srv_click_cll none 0 0
camp_funds avg 3 month
camp_guide avg 3 month
contact_num avg 3 month
dji_close dif 2 month
CNT_DAY_TXN min 3 month
contact_num trd 3 month
txn_di_amt trd 3 month
```

Include Reference to Main File

For example, the DDSFT may be engaged by including a single include statement with an include reference to a main macro file:

```
*Include main script file;
%include "/sasdata/macros/data_prep/wi/wi_mrd_main.sas";
```

This file contains a series of % include statements may call individual script files. Each of the individual files has a version and last updated date, and will print out this information to a log (e.g., a SAS log) when this main % include statement is invoked. An example showing include statements within the main WI MRD include file follows:

```
/* Initialization */
%include "/sasdata/macros/data_prep/wi/macros/basis_ver1.0.sas";
%include "/sasdata/masros/data_prep/wi/macros/
reference_files_ver1.0.sas";
/* Prepping files "/
%include "/sasdata/macros/data_prep/wi/macros/flags_ver1.0.sas";
%include "/sasdata/macros/data_prep/wi/macros/file_prep_ver1.0.sas";
/* Main */
%include "/sasdata/macros/data_prep/wi/macros/main_body_ver1.0.sas";
/* Basic extracts from main CWE data */
%include "/sasdata/macros/data_prep/wi/extracts/geo_ver1.0.sas";
%include "/sasdata/macros/data_prep/wi/extracts/macct_ver1.0.sas";
%include "/sasdata/macros/data_prep/wi/extracts/mplan_ver1.0.sas";
%include "/sasdata/macros/data_prep/wi/extracts/pindiv_ver1.0.sas";
%include "/sasdata/macros/data_prep/wi/extracts/roll_ver1.0.sas";
%include "/sasdata/macros/data_prep/wi/extracts/windiv_ver1.0.sas";
%include "/sasdata/macros/data_prep/wi/extracts/calls_ver1.0.sas";
%include "/sasdata/macros/data_prep/wi/extracts/myplan_ver1.0.sas";
%include "/sasdata/macros/data_prep/wi/extracts/contact_ver1.0.sas";
%include "/sasdata/macros/data_prep/wi/extracts/indquiz_ver1.0.sas";
%include "/sasdata/macros/data_prep/wi/extracts/epdsw_ver1.0.sas";
%include "/sasdata/macros/data_prep/wi/extracts/tamquiz_ver1.0.sas";
%include "/sasdata/macros/data_prep/wi/extracts/txns_ver1.0.sas";
%include "/sasdata/macros/data_prep/wi/extracts/withd_ver1.0.sas";
%include "/sasdata/macros/data_prep/wi/extracts/market_ver1.0.sas";
%include "/sasdata/macros/data_prep/wi/extracts/prund_ver1.0.sas";
%include "/sasdata/macros/data_prep/wi/extracts/loandt1_ver1.0.sas";
%include "/sasdata/macros/data_prep/wi/extracts/afund_ver1.0.sas";
%include "/sasdata/macros/data_prep/wi/extracts/wealth_ver1.0.sas";
%include "/sasdata/macros/data_prep/wi/extracts/loan_ver1.0.sas";
%include "/sasdata/macros/data_prep/wi/extracts/dfrl_ver1.0.sas";
%include "/sasdata/macros/data_prep/wi/extracts/acct_ver1.0.sas";
%include "/sasdata/macros/data_prep/wi/extracts/plan_ver1.0.sas";
%include "/sasdata/macros/data_prep/wi/extracts/ndt_ver1.0.sas";
%include "/sasdata/macros/data_prep/wi/extracts/wpasw_ver1.0.sas";
/* Transformations */
%include "/sasdata/macros/data_prep/wi/macros/
transformation_ver1.0.sas";
%include "/sasdata/macros/data_prep/wi/macros/
trans_automation_ver1.0.sas";
%include "/sasdata/macros/data_prep/wi/macros/file_merge_ver1.0.sas";
/* Cleaning up space */
%include "/sasdata/macros/data_prep/wi/macros/cleanup_ver1.0.sas";
```

Create Framework Ready Data

Once the basic working library is defined and the script files are properly included, the DDSFT may use a single call mechanism, wi_mrd, to create framework ready data as per the following example wi_mrd mechanism:

```
%wi_mrd(mode=modeling,
        tag=_2,
        schema=a517200,
        population_file=ip_samp,
        variable_file=cadsum_test_defs,
        aggregation=ip,
        user=a517200,
        pass=test12#,
        email=                           .com);
%Timestamp_log;
```

Where the constituents of the framework ready data creation mechanism (e.g., wi_mrd) may be as follows:

Mode: This field can be frameworking, scoring, or nonprod. It indicates whether or not to run the process on the frameworking, scoring, or nonprod server. This field controls a series of library definitions that point to one server or the other.

Tag: This field can be any normal character. This field will be appended to all intermediary and output files. This allows the DDSFT to set a special tag to identify files belonging to their process. This also allows two processes to work in the same schema at the same time.

Schema: This field indicates the DDSFT schema to be used. All work will be done within this schema. A library pointing to this schema will be created internally by the code. This schema is the name of the schema that your population and variable definition files reside in.

Population_file: This is the name of the population file created in above in Create a population table (see ¶¶[0022] et seq.). This table may to be in your working schema.

Variable_file: This is the name of the variable definition file created above in Create a variable definition list (see ¶¶[0027] et seq.). This table also may in your working schema.

Aggregation: This is the unit over which all files are aggregated, and for this example can be acct, ip, plan, client, market_segment, or business_unit.

User: Your username. This is used to connect to the DDSFT database.

Pass: Your password. This is used to connect to the DDSFT database.

Email: Once the process is complete, it will alert the user by sending an e-mail to their inbox.

Create Framework Ready Data Output

In one embodiment, upon completion, the DDSFT will send an e-mail to the user with the location of the output files 111. The number of output files depends on which variables were selected during the process. The code can output anywhere between 1 and 25 files. These files are named using the table name found in the data dictionary with "_all" appended: e.g. market_all, wealth_all, macct_all, etc.

An example use of the DDST follows:

```
options mprint mlogic symbolgen;
options sastrace=',,,d' sastraceloc=saslog;
options dbidirectexec;
%let user =        ;
%let pass = ******;
%let HPAHost=pvrtp01.fmr.com;
libname working      DDSFT server = "      DDSFT.com" user = &user
password=&pass
database=aae_data schema=a517200 preserve_tab_names=no;
options set=TKSSH_USER="&user";
options set=TKSSH_IDENTITY="/home/&user/.ssh/id_rsa";
%let HPAPath=/opt/SASHPA/TKGrid;
option set=GRIDHOST="&HPAHost";
option set=GRIDINSTALLLOC="&HPAPath";
%include "/sasdata/macros/data_prep/wi/wi_mrd_main.sas";
%wi_mrd(mode=modeling,
        tag=_ea,
        schema=a517200,
        population_file=pop,
        variable_file=ea_var_def,
        aggregation=ip
        user=&user,
        pass=&pass,
        email=         myEmail@email.com);
                                     1, 0-1            Top
```

Above the % include statement, the DDSFT sets up the "big data" appliance. Once the environment is set up, then the user calls the library that defines the call mechanism. Finally, a single call is made. The mechanism employs two input files: (1) one file that defined the population (an individual identifier+an event date) 104, 105 and (2) a listing of all variables that the user wants 101, 102, with the transformations indicated. Example output may be seen 405 of FIG. 4. Here, one can see a single output table of variables the user has requested. It includes, for each individual (ip), for each event_date, each of the variables is calculated with the prefixes of the variables indicating the transformations that were performed. This data is ready to be input into a predictive framework.

FIGS. 2a and 2b show a logic diagram illustrating embodiments of DDSFT component(s) for the DDSFT. The DDSFT library is designed to work flexibly, speedily, on-demand and in-database by users, for example, in the SAS-HPA/DDSFT environments. In one embodiment, the DDSFT may employ SAS macro logic to control a sequence of SAS SQL queries that extract the data from raw base tables (e.g., in CWE) and then perform transformations on these extracts. The macro logic works largely through a series of binary flags that control whether or not statements are executed.

Setting Up Libraries, DDSFT Server

The DDSFT server may initiate 201 the instantiation numerous components 202 to carry out data transformations. As already discussed in 100a, 100b, 141, of FIG. 1, a flag component 141 of FIG. 1 may be instantiated by user request 100a, 100b, which in turn may instantiate all other DDSFT sub components (e.g., pop join component 142, extract component 143, and transform component 144 of FIG. 1).

As part of the instantiation 202, the DDSFT may have the mode parameter set the HPAHost parameter, and determine the set of libraries and working schema to be used by the DDSFT/code. The mode can be set to frameworking, scoring, or nonprod; e.g., these may correspond to the Production-Frameworking, Production-Scoring, or Non-prod DDSFT databases. This element may require the user's username and password to use in the libname definition to connect to the DDSFT environment 205 or an error/re-login screen may result 207.

Setting Global Variables

Upon instantiation 202 and establishing which mode/libraries/schema to use 210, the DDSFT may set its global variables 212. For example, this may be accomplished by establishing a % set_global_variables macro which sets global variables related to the unit of aggregation, ip, plan, acct, client, market segment, or business unit 212b. Also, a macro, % creating_history_vals, may be established to look at the input variable definition file and determines the maximum amount of days, weeks, and months the code needs to extract and writes these values to global variables 212c.

Creating Reference Tables

The DDSFT may then create reference tables 217. Two reference tables may be used in this by the DDSFT. The first is the full set of variables 103 of FIG. 1 included in the data dictionary, along with table and element reference numbers. This table may used in conjunction with the user's variable definition table 102 of FIG. 1 to set control flags.

The second is a calendar table 106 of FIG. 1 that is used to circumvent some of the difficulties involved in working with dates in-database. For example, SAS has very specific ways it wants to work with dates, and many of these ways involve out-of-database operations; by using this reference table, it circumvents SAS's need to transform dates from one format to another, and allows the code to be created using on very basic date functions and comparisons. In one embodiment, the main calendar table may be stored in a public folder of each of the main DDSFT boxes. During a run, this table may be copied into the user's working directory.

Creating Control Flags

The DDSFT employ the created reference tables 217 to interpret the supplied variable definition file to create control flags 219. The DDSFT/code employs binary flags. Flags are created to determine (1) whether or not certain base tables are read, (2) which time periods are extracted from those tables, and even (3) whether or not individual parameters are extracted from those tables.

For example, 3 sets of flags may be used (e.g., see 141x of FIG. 1) as the DDSFT iterates for each table 219b, 219f:

(1) Are there any variables in a given table? If yes, set flag=1, if not, set flag=0. 219c.

(2) If variables exist in a given table, does the flag=1 for all present time grains? Set flag=0 for all others. 219d.

(3) From a given table in the database, which variables are desired? Only perform calculations for those (flag=1). 219e.

Apply table flags: Can skip large swaths of database queries by restricting our code to only the tables required.

Apply time flags: Within each table logic, different temp tables need to be created for each time bin (day, mnth, yr). We can skip unneeded ones with this flag.

Apply variable flags: Within each table logic, we can skip calculating rows that aren't desired. This saves space and processing time.

The flags1 table joins the user's/frameworker's variable definition file with the variable reference table to create a table with the table/element flag name and a column that is 1 if a variable is present in the user's file. The DDSFT may then employ the symput call in the main body of the code to write this to macro variables.

The flags2 table uses flags1 to find any table where a variable is present, and then again uses symput in the main body to write these values to macro variables.

The flags3 table again uses the flags1 table to find which time grain extracts need to be performed for each base table. Note that if no transformations (and hence no time unit) is given, then the default is day. Any value where no transformation is desired will be the value of the parameter on the day before the event happened.

Example Flag Use

Flags may be used in a number of ways. As mentioned, flags may come in three categories: (1) flags that control whether or not an entire table is touched in the database, (2) flags that control if prep tables for a given tie grain are computed, and (3) flags that control whether a single variable is extracted. In the following command flow examples, a slide "Setting run-time flags" gives a high-level overview of the flag structure.

The following command combines the user's input table with the reference table stored in the code's internal library; this calculates the flags for creating specific columns (&tNeN):

```
*Flags for creating specific elements;
proc sql; drop table &library.flags1&tag; quit;
proc sql;
    create table &library.flags1&tag as
    select distinct t1.*
    t2.trasformation,
        2.time_period,
        t2.time_unit,
        (case when transformation is null then 0 else 1 end) as flag,
        ("t" || trim(tl. Table_num) || trim(t1.element_num)) as
    te_combo from &library.var_lookup&tag t1
    left join &library.&var_def t2 on upcase(t1.variable_name) =
upcase(t2.variable_name);
quit;
```

This next command then aggregates the previous table and calculates the flags (&run_table_nameN) for running through each of the tables in the database:

```
*Flags for running tables;

proc sql; drop table &library.flags2&tag; quit;
proc sql;
    create table &library.flags2&tag as
    select table_num,
        max(flag) as run_table,
        ("run_table" || table_num) as run_table_name
    from &library.flags1&tag t1
    group by t1.table_num;
quit;
```

This command looks at the table above and aggregates by time to create the time period flags:

```
*Flags for running time periods within tables;

proc sql; drop table &library.flags3&tag; quit;
proc sql;
    create table &library.flags3&tag as
    select table_num,
        max(flag) as run_table,
        time_unit,
        (case when lower(time_unit) in ("0", "day", "days") then
                ("run_table" || table_num || "day")
            when lower(time_unit) in ("week", "weeks")
            then
                ("run_table" || table_num || "week")
            else ("run_table" || table_num || "month") end) as
    run_table_time from &library.flags1&tag t1
    where time_unit is not null
    group by t1.table_num, time_unit;
quit;
```

The next command checks both table (&run_tableN) and time grain (id_daily_extract, id¬_weekly_extract, id_monthly_extract) flags:

```
*Extract logic for each of the 25 extracts;

%if &run_table1 = 1 %then %do;
    %wealth_extract;
    %if &run_table1day = 1 %then %wealth_daily_extract;
    %if &run_table1week = 1 %then %wealth_weekly_extract;
    %if &run_table1month = 1 %then %wealth_monthly_extract;
    %wealth_cleanup;
%end;
%if &run_table2 = 1 %then %do;
    %geo_extract;
    %if &run_table2day = 1 %then %geo_daily_extract;
    %if &run_table2week = 1 %then %geo_weekly_extract;
```

```
*Extract logic for each of the 25 extracts;

%if &run_table2month = 1 %then %geo_monthly_extract;
    %geo_cleanup;
%end;
%if &run_table3 = 1 %then %do;
    %wpasw_extract;
    %if &run_table3day = 1 %then %wpasw_daily_extract;
    %if &run_table3week = 1 %then %wpasw_weekly_extract;
    %if &run_table3month = 1 %then %wpasw_monthly_extract;
    %wpasw_cleanup;
%end;
%if &run_table4 = 1 %then %do;
    %epasw_extract;
    %if &run table4day = 1 %then %epasw daily extract;
```

This command checks variable flags (&tNeN) flags before performing calculations. If any flags are 0 then no computation is performed and the value is null:
Appending back onto weeknum table;

```
%drop_table_iff (&libarary.wi_calls_week&tag);
PROC SQL;
    CREAT TABLE &library.wi_calls_week&tag AS
SELECT
    t1.&unit,
    t1.week,
        t1.event_date,
        (case &t6e1 when 1 then
            (case when t2.number_of_calls = . then 0 else
            t2.number_of_calls end)
    end
    as number_of_calls,
        (case &t6e2 when 1 then
            (case when t2.call_dur_sec = . then 0 else
            t2.call_dur_sec end) end)
    as call_dur_sec,
        (case &t6e3 when 1 then
            (case when t2.BUSINESS_BC = . then 0 else
            t2.BUSINESS_BC end) end) as
    BUSINESS_BC,
        (case &t6e4 when 1 then
            (case when t2.BUSINESS_DB = . then 0 else
            t2.BUSINESS_DB end) end) as
    BUSINESS_DB,
        (case &t6e5 when 1 then
            (case when t2.BUSINESS_DC = . then 0 else
            t2.BUSINESS_DC end) end) as
    BUSINESS_DC,
        (case &t6e6 when 1 then
            (case when t2.BUSINESS_DCGEN = . then 0 else
            t2.BUSINESS_DCGEN end) end) as
    BUSINESS_DCGEN
        (case &t6e7 when 1 then
            (case when t2.BUSINESS_EP = . then 0 else
            t2.BUSINESS_EP end) end) as
    BUSINESS EP,
```

Prepping Commonly Used Files

Upon creation of control flags 219 and moving 220a to 220b of FIG. 2b, the DDSFT may generate structured files for repeated use 222 via its population join component 142 of FIG. 1. The population join component 142 of FIG. 1 may determine populations within specified time periods for each aggregation grain suitable for joining with base tables as discussed in greater detail below 222.

There are a number of files that are used in multiple places in the driver extractions, and so it makes sense to place the execution of these tables before any of the individual extracts. A % prepping_files macro may create these files. It begins with the main population file 222b, 104, 105 of FIG.

1, and then may add information and modifying this file to be ingested by each extract 22c.

The resulting script may start by using the global variables set earlier to create files that list the number of days, weeks, and months to be populated by the code, and as such iterate for each created file per period 222d.

It then creates files (unit_daynum, unit_weeknum, unit_monthnum) appending the population table (units and event dates) to the list of values. These files are useful in many places where we want to extract only the desired days, weeks, or months from a given table 222e.

The unit_dates table takes the population file (unit and event date), along with the number of days, weeks, and months, and translates this into a large utility table that maps the days, weeks, and months onto real dates. This table can get to be quite large as it creates one row per day included in the sample 222f.

The logic for the all_dates file depends on the type of unit aggregation used. This file takes the main population file and appends missing needed parameters. The library joins the base tables in the database using the primary keys (in this embodiment, acct_id, ip, or plan_id) 222g. The DDSFT also records the active or terminated status for each account for later processing. The DDSFT may use a combination of tables to join between different primary keys, such as one for joining between ip and acct_id), or another for joining acct_id to plan_id and snapshot_cdi_dc_acct_status_cd in this embodiment. Creation of unit_dates and all_dates is some of the more process intensive queries in the library, and so much of the processing time is spent here.

Many files need to be created for processing the different time aggregations 222h. The first three are used in extracts from monthly base tables. Unit_month_interp is a complicated query that takes the unit_dates table and determines the overlap between the months as defined by the code (one month previous to event date) and calendar dates. These weights are used in translating monthly data to our month convention. Unit_day_interp is a simpler version of the month file, it creates values needed to interpolate monthly tables onto a single day within the month. Unit_week_interp is nearly identical to the above day file, except it only calculates values for days in the middle of the week (mod (daynum,7)=4). When joining to monthly files, this is identical to calculating the value for each individual day and aggregating over all. (See the extract section below for more details on how weighting and interpolation is performed.)

Similar files exist for when, instead of using a monthly base table, we use a table that can be updated at any time, with a maximum resolution of daily. These files (unit_month_update, unit_week_update, and unit_day_update) all are based on row effective and row expiration dates. Here, we create files that have the start and end of the week and month. These files will be used later to determine how many days from each period lie within each week and month. Because these start and end dates are specific to each row in each base table, this is the only pre-processing we can do at this stage for this type of aggregation.

In addition to considering different time aggregations, we also need to pre-process files at different unit aggregations 222i. This part has less to do with the unit desired by the user, and more by the basic structure of each of the base tables in the database. The base tables used here rely on ip, acct_id, plan_id, or sometimes source_cust_sid. We need to create intermediate files between the unit of aggregation (acct, ip, plan, client, market segment, business unit) and the basic unit of the table (acct_id, ip, plan_id). The logic for these tables may also be determined by the base unit, because when the unit of aggregation is the basic unit of the table so the DDSFT need only list that unit once. Listing it twice will cause an error. Acct_period, ip_period, and plan_period may be examples of these files. The DDSFT may also create these for the above interp and update tables. If more periods 222j need to be processed, iteration will continue 222d.

Performing Extracts

Upon generating the structured files for repeated use 222, the DDSFT extract component 143 of FIG. 1 may extract raw data from the base tables in the database 225. In one embodiment, the DDSFT may extract the data in two dimensions: (1) unit of aggregation, and (2) unit of time. The unit of aggregation is the easier of the two to perform. The unit of aggregation can be at the plan/participant (account) level, ip, plan, client, market segment, and business unit level. In the extractions, this unit is identified by the &unit variable. This variable corresponds to how the primary key is referred to in the database. Here, we use acct_id, ip, plan_id, client_id_nbr, or dc_market_segment_cd. Business_unit is a special code. When running business unit, the code looks at every single workplace individual within the time period of interest.

Unit aggregations are done by creating preliminary files between the native grain of the table (acct, ip, or plan) and the grain desired, appending the unit onto the raw data, and then grouping by the unit. In one embodiment, the grouping is specified within the DDSFT. In many instances, the DDSFT provides grouping when a user may want the number of calls for a given unit over a given time period, The DDSFT may sum all calls that fit the criteria. In other instances, this function is not clear. If a user wants a value to be aggregated at a different level, then, in the current state of the code, they may modify the library to create their desired aggregation.

Aggregating data by unit of time is a more complex process. The algorithm to aggregating by time depends both on the time requested and the native grain of the table. A number of tables are prepared for this process. We begin this process by creating a table that lists all units, over all days within the time period desired, joining with various cross-reference tables to grab acct_id, ip, and plan_id. This is called the all_dates table, and can be one of the most intensive queries in the process. In addition to relating acct, ip, and plan to the unit, it also uses the event date to map, each day within the period to the appropriate day, week, and month time periods.

FIG. 3 shows a block diagram illustrating embodiments of a extraction mappings for the for the DDSFT.

The figure 305 shows an example mapping between calendar dates and extracted months, weeks, and days.

In this example, the event happens on August 18. The DDSFT begins its analysis on the day previous to this, August 17. Time periods are counted backwards from the event date, and are indicated in the code by daynum 310, weeknum 315, and monthnum 320. Days and weeks are counted backwards, one daynum per day, and likewise, one weeknum per seven day period. Months are different: they are not a set period of days or weeks. Months are calculated starting and ending based on the event date. If the event occurs on August 18, then the previous month would last from July 18 to August 17, the month previous to that would be June 18 to July 17. This time period will change depending on the total number of days in a given month.

Note that no data is used following the event date. Normally, if the DDSFT is looking at monthly data, month 1 in the example would be calculated by weighting the data from July and August. However, monthly August figures could be tainted by data prior to the event date, which we don't want to include. In such an example, the DDSFT may throw out all August data and only use data from July. Likewise, for the single yearly table, the DDSFT may use data from the year previous to the event date, not from the year of the event date itself.

The all_dates table also has additional date information. It contains the month, day, and year of the event, the day corresponding to the particular row, and also the day corresponding to an index in the calendar table. Because of the difficulty in performing in-database date operations, it was necessary to create a separate calendar table to map back and forth between day, month, year, and date in a consist format between all tables.

Year-Based Tables

There is a single year-based table in the extract. Because the DDSFT does not want to include any data after the event-date, it may obtain the data for year previous to the event date.

Day or Event-Based Tables

Daily and event-based tables extracts may be performed by the DDSFT. Here, rows are may be populated if an event occurs on this date. For event-based tables, the DDSFT may first aggregate to a single day. So, for example, if multiple calls happen on a single day, the DDSFT may find the total calls on that day, or take the max quiz event indicator to see if the participant took any quizzes on that day. Then, the DDSFT may perform an inner join on a previously prepared table that has a listing of all dates in the sample, and their corresponding daynum, weeknum or monthnum. Then, these tables are simply aggregated over daynum, weeknum, or monthnum, along with unit and event_date to find the total events for the given time period.

Week-Based Tables

In an embodiment where there is a single week-based table in the sample that is sparsely populated, because it is small and only a single table, it is more efficient to transform this week-based table to a day-based table, rather than specially prepare week-based aggregation tables, like the DDSFT has done for the different native grain types. To transform to daily, the DDSFT may attribute any counts over the week to each day, dividing each value by 7. The DDSFT may then proceed as it would in the above daily-based process.

In an example of aggregating counts from daily-based tables 325, the counts, say calls, or contacts, are may be summed over the period in question. Another example would be a binary result (0/1) that indicates whether or not an event happened over a period of time.

Month-Based Tables

Monthly grain tables are the next most complicated table to use. Many of the tables in database tables are monthly-based tables, using a snapshot_date indicator of the first of the month, identifying that the values included reflect the previous month. These tables tend to have continuous aggregated values, like total number of contacts, or total assets. There are three difference cases to consider:

(1) Mapping monthly grain to monthly extract: Each monthnum overlaps up to two months. The DDSFT may create an intermediate file, unit_month_interp to determine how much overlap there is between the monthnum, and the two calendar months. The DDSFT may then use this file to weight the values in the given month, so that:

Var=[(number of days in month 1)×value of month 1+(number of days in month 2)×value of month 2]/total days This table is created using a complicated set of logic because it needs to take into account the varying number of days within a month. It also needs to know that if an event date is on July 31, the preceding month starts on June 30, not June 31.

FIG. 3, 330 shows an example of mapping monthly grain tables onto daily, weekly, and monthly data pull. The values in the month boxes are example monthly figures used to weight or interpolate the monthly, weekly, or daily values. Note that the DDSFT does not need to use monthly data from August, since those values could reflect changes that happened after the event.

(2) Mapping monthly grain to daily extract: To map month to days, the DDSFT may use the day of the month to interpolate between the first and second month. To do this, the DDSFT may create the unit_day_interp table, a table that determines the weights that should be used in this interpolation.

(3) Mapping monthly grain to weekly extract: To map months to weeks, the DDSFT may do a similar procedure to the daily extract, using the same type of interpolation, and create the unit_week_interp table. In this case, however, the DDSFT may interpolate to the $4^{th}$ (middle) day of the week. Given that a week will still only overlap at most two months, determining the average on the only the middle day is identical to creating a full weighted average for the week.

Update-Based Tables

There are a large number of tables in the extract that are only modified when some piece of information in them has changed. In these, each row is governed by row effective and row expiration dates. These tables tend to include discrete values that do not change often, such as plan characteristics, or demographics, however, they do sometimes have continuous values, such as deferral rates.

These two cases, discrete and continuous, were treated differently. In discrete cases, the DDSFT may determine in which state, during the period of question, did the individual spend the most time. So, if for a given month, the individual was married for 20 days, and unmarried for 10, then the individual is marked as married. The weekly mapping is done similarly. Daily mappings in the update case are trivial—if the day is included in the period, then that value is mapped to the day. In this case, there is no need to count up proportions spent in either state. For continuous values, such as deferral rates, we look at how long the individual spent in each state, and again, use a weighted average to determine the final value.

A number of preliminary files are created for this process, unit_day_update, unit_month_update, and unit_week_update. These tables are quicker than their monthly counterparts, because much of the processing depends on the actual pattern of the row effective and row expiration dates.

FIG. 3, 335 shows an example of mapping update-based tables onto monthly, weekly, and daily data pull. The two values correspond to a discrete value (W, X, Y, Z), where we would take the value where most of the time is spent, and a continuous value (0, 10, 20, 30) where we determine the number of days in each period and take a weight average.

Many of the tables have their own specific considerations. Details on each of the 25 extracts are as follows:

WEALTH: This is one of the simplest extract logics, it is based on a monthly table based on ip. Missing values are imputed to 0.

GEO: The main table this is based on is an update table (using row effective and expiration dates) and is based on ip. This table is joined with the zip-to-branch table to determine distances to the nearest branch. Values here are not imputed, and depending on the population, there can be significant missing values that will need to be dealt with by the frameworker.

WPASW: This extract is based upon the sole weekly table in the schema. Because of this fact, this table is treated differently than others. The first step in this extract is to change the weekly grain to a daily grain, and then use the daily grain process to extract information. This table is relatively small, so increasing it from weekly to daily does not, in comparison to other extracts, use up many resources. The native unit grain of the table is acct_id, and joins to an enrollment table on online_enrl_src_sid.

EPASW: The second PASW-related table, is based on a daily grain and acct_id. It is joined with two dimension tables by their respective primary keys. This table is also typically not well populated.

MYPLAN: The My Plan table is based on acct_id and has a daily grain. The table is again, generally not well populated, and missing values are imputed to zero.

CALLS: The main call table is based on source_cust_sid, and has one row per event (inbound call). We link source_cust_sid to ip by a crossreference table. There has been a trend recently in Fidelity databases to move from ip to source_cust_sid, so it is possible that in the near future more tables will need this extra join. Because of the large number of call reason types, the types are binned into common categories. These categories can be found in the data dictionary.

MARKET: This is a special table, in that it does not rely on data from our warehouse, rather it relies on a currently manually created table. Data for the market daily table, along with references to sources, are found in the data dictionary. This manual process works for building historical frameworks, but is an issue for production scoring. If a framework goes into production scoring using this data, then these data will also need to be updated regularly, and there is no current process to do so. A future upgrade would be to automatically grab these data from the web and append the values to this table. This table has a daily grain and has no aggregation unit, since it depends only on time.

MPLAN: The monthly plan extract relies on a table at the plan_id and monthly level. These values are binned into plans associated with active and terminated accounts, and missing values are imputed to 0.

PFUND: This table goes deeper into the monthly plans values, by looking at assets allocations by plan. To be more efficient, data are kept at the plan level until late in the process, where they are joined on the unit of aggregation. This is a monthly, plan-level table.

TXNS: The transactions table is an event-based table that uses acct_id. This is a simple extract, but the initial query that extracts the transactions can be time consuming.

WITHD: The withdrawals table goes deeper into the withdrawal-type transactions. It is event-based and account-based.

CONTACT: The contact table is based on event and ip (actually source_cust_sid), it records all successful EM & DM outbound contacts using data from two main tables and several associated dimensional tables. For this table, campaign codes and kit codes are binned into broad category groups based on their descriptions in the base table. This coding was done with little background knowledge of the campaigns, and so ought to be updated with a more thorough investigation of each code. These bins are recorded in the data dictionary.

AFUND: The account fund table collects information about asset and fund allocation at the account level on a monthly basis. This is one of the largest tables, and so can be a big drag on processing time.

INDQUIZ: This table looks at the legacy guidance information contained in and should be phased out when better guidance data becomes available. It is on the event, source_cust_sid (ip) level.

TAMQUIZ: This table also looks at legacy guidance information, and also should be phased out when better guidance data becomes available. It is also on the event, source_cust_sid (ip) level.

PINDIV: This table is based on an update, (row effective and row expiration dates), ip-based table. It includes the best birth_date data, and also data on affluence and pwi relationships.

WINDIV: This is based on an update, ip-based table. It contains workplace specific information about individuals.

LOAN: This table is based on the an acct_id and update-based table. It also relies on data from another table to determine loan-to-asset ratios. Because of the update structure of the table, and the fact that an account can be associated with multiple loans, it is necessary to map to the time grain before aggregating past the account level.

LOANDTL: The loan detail table extracts only two drivers from a monthly, account-based table.

ACCT: The main account table is based primarily on the main account table, but also takes data from enrollment tables. All are update, account-based tables.

DFRL: The deferral table is an account-based update table. In general, deferral rates are not well populated, or accurate.

NDT: This table is based on the non-discrimination testing table, a yearly, account-based table. Because we never want to have data included in the extract past the event date, all data is taken from the year prior to the year of the event. This is the only yearly table included. This table is not well-populated, and because of the high-quality, it has deliberately not had missing values imputed.

MACCT: The monthly account table is the main table for account balances and interactions. It is at the account, monthly level. It is a large table, but a simple extract.

PLAN: This table is based on a plan-specific table, with information derived from another table about industries. It is a plan-level update-based table. This table has special logic for aggregating from accounts to an individual. When dealing with ip, we first look at all plans associated with active accounts. Only if there are no active accounts, then do we look at plans associated with terminated plans.

ROLL: The last table is derived from a single table alongside a number of smaller dimensional tables. The main table is an event-based, account-level table.

Only very basic imputations are done by the code, typically where no events are seen, or where a null amount would logically equate to zero. For categorical values, dummy missing value characters may be used. The details of the imputations used for each variable are located in the data dictionary.

Performing Transformations

Moving back to FIG. 2b, the DDSFT includes logic to perform the transformations 230 based upon the initial variable flag files created at the beginning of the process via its transformation component 144 of FIG. 1. The DDSFT/ code, in the automated_transforms macro, uses the initial flags1 goes through a series of reformatting and string manipulation, through proc sql and data step code, to take the original flag file and output macro calls to the individual transformations. The macro call for each of the 9 transformation macros are: % create_avg, % create_min, % create_max, % create_dif, % create_cov, % create_std, % create_sum, % create_cad, and % create_chg. These macros take, as parameters, (1) the time period, (2) the table name, (3) a list of all variables to be transformed, and (4) the time unit.

The transformation feature calls, themselves, are kept separate from the transformation automation logic. Each transformation takes an input table with one row per time unit, for each unit/event date combination. It performs its calculation on this table, grouping by unit and event date to output a single row for each individual.

Calculating sums, minima, maxima, and averages can be performed in a single operation. To ensure all calculations are kept in-database, calculation of standard deviations and coefficient of variations require a two-operation phase, where in the first operation, we calculate the average of each group of observations.

Standard deviation is calculated as: $std\_val = sqrt(sum(val-avg\_val)^2/(N-1))$ Coefficient of variation is $cov\_val = sqrt(sum(val-avg\_val))^2/((N-1) \times avg\_val)$ Where val_avg is the average value calculated in the first stage and N is the number of time periods.

Creating difference, percent differences, and changes in state use a different method. The macro looks at only the first and last period included desired. For this reason, if the user wants to look at see the percent difference over the last month, they will need to define the transformation in the input file with two months. The calculation calculates the difference between the first and last, inputting a value of one would, by definition, show no change. Percent differences are calculated relative the first period included.

Changes are defined by 1, −1, or 0. A positive change means that the most recent value is greater than the previous value. This can mean different things depending on the value used. This transformation can use character values, so here, a change from A to Z would be a positive change, although that may make no sense given the real values of A and Z. This allows for more insight when the DDSFT looks at indicator variables, such as marital_status, where instead of just showing a change in marital status, it can instead look at see who got married (+1) or who got divorced (−1).

In one embodiment, transformations use the % DO_OVER macro created by Ted Clay (Clay Software & Statistics) and was presented online for public use. In normal SAS, the array structure is only allowable within a data step. This posed problems, given that it is necessary to loop, within a macro, over all desired variables. The DDSFT uses this macro as an elegant solution to that problem for transformation automation.

The following command shows creation of a macro call statement, which is then executed (e.g., within SAS). This execute statement calls a separate macro which performs the transformations on the raw files that come out of the initial data prep operation:

```
Creating execute statement for calling transformations;
data_null;
   length prefix $ 10;
   set &library.trans_distinct&tag;
   select (table_num);
      when (1) prefix = "wealth";
      when (2) prefix = "geo";
      when (3) prefix = "wpasw";
      when (4) prefix = "epasw";
      when (5) prefix = "myplan";
      when (6) prefix = "calls";
      when (7) prefix = "market";
      when (8) prefix = "mplan";
      when (9) prefix = "pfund";
      when (10) prefix = "txns";
      when (11) prefix = "withd";
      when (12) prefix = "contact";
      when (13) prefix = "afund";
      when (14) prefix = "indquiz";
      when (15) prefix = "tamquiz";
      when (16) prefix = "pindiv";
      when (17) prefix = "windiv";
      when (18) prefix = "loan";
      when (19) prefix = "loandtl";
      when (20) prefix = "acct";
      when (21) prefix = "dfel";
      when (22) prefix = "ndt";
      when (23) prefix = "macct";
      when (24) prefix = "paln";
      when (25) prefix = "roll";
   end
   if upcase(time_unit) in ("MONTH", "MONTHS") then
   time_units2= "month";
   if upcase(time_unit) in ("WEEK", "WEEKS") then
   time_unit2 = "week";
   if upcase(time_unit) in ("DAY", "DAYS") then
   time_unit2 = "day";
   if lowcase (transformations) in ("avg", "min", "max",
   "std", "dif", "chg", "cad", "sum") then do;
      call execute ("%create_" || transformation || "(duration" ||
   time_period ||
   ", prefix=" || prefix || ",list=&" || identifier || ",timenuit=" ||
   time_unit2 || ");");
End; 130,17 94%
```

Merging Final Files

Once the final transformed files are created 230, the DDSFT may merge them together to present a single clean table to the user 235. One table is created per extract, so the user can have anywhere between 1 and 25 files at the end of running the program, depending on which drivers the user selected.

The merge logic may be contained in a file file_merge. This file dynamically creates the SQL queries that merge the transformed tables. This process starts with the tables created to produce the automated transformation logic. They are a mix of data step, string logic, and call execute statements. String % DO_OVER statements for the body of the query and join clauses are both created dynamically based, pieced together for each table, and then are formatted into a single query by a call execute statement.

The following command creates a macro/execute call that combines the output of possibly hundreds of temp tables into single, easily-digestible tables for the users:

```
select (table_num);
    when (1) prefix = "wealth";
    when (2) prefix = "geo";
    when (3) prefix = "wpasw";
    when (4) prefix = "epasw";
    when (5) prefix = "myplan";
    when (6) prefix = "calls";
    when (7) prefix = "market";
    when (8) prefix = "mplan";
    when (9) prefix = "pfund";
    when (10) prefix = "txns";
    when (11) prefix = "withd";
    when (12) prefix = "contact";
    when (13) prefix = "afund";
    when (14) prefix = "indquiz";
    when (15) prefix = "tamquiz";
    when (16) prefix = "pindiv";
    when (17) prefix = "windiv";
    when (18) prefix = "loan";
    when (19) prefix = "loandtl";
    when (20) prefix = "acct";
    when (21) prefix = "dfel";
    when (22) prefix = "ndt";
    when (23) prefix = "macct";
    when (24) prefix = "paln";
    when (25) prefix = "roll";
end
if upcase(time_unit) in ("day", "days", "DAY",
"DAYS") then append = "d";
if upcase(time_unit) in ("week", "weeks",
"WEEK", "WEEKS") then append = "w";
if upcase(time_unit) in ("month", "months",
"MONTH", "MONTHS") then append = "m";
str1 = "%" || "DO_OVER (VALUE=&" ||
trim(identifier) || trim(", PHRASE=t") || trim
(clearum) || "." ||
    trim(transformation) || trim(chartime_period) ||
trim(append) || trim("_?, between=COMMA)")
    str2 = "INNER JOIN &library." || trim(prefix) ||
"_" || trim(transformation) || trim
        trim(append) || "&tag t" || trim(charnum) || trim(" on
(t0.&unit = t") || trim(charnum) || " "&unit and
        t0.event_date = t" || trim(charnum) || ".event_date)";
```

Cleaning Up

Upon creating the merged files 235, the DDSFT may parse and homogenize the created files into a clean DDSFT structure 240. Cleaning up may include a % cleaning_up macro, which deletes all intermediate files created during the process that weren't dropped within a specific extract. This also includes logic with a call execute statement that dynamically deletes the transformation output tables. This logic begins with the files that were created during the transformation creation process. As part of the cleanup process, the code also clears out library names it used during the process using the 'libname<name>clear;' statement.

Updating the Framework Ready Data Code

It is expected that this library of code is viewed a first operation in ongoing refinement of framework drivers, and it will be constantly evolving as users find new sources of data, perform new transformations, or just make improvements on the existing data extract. It will also need to evolve to reflect basic changes in the structure of the base tables it uses. As such, with iteration and feedback via itself, the DDSFT may constantly evolve and improve its processing efficiency.

In one embodiment, the DDSFT may implement its library of code as a shared repository. Individual users will not be the ones to implement the changes; rather, they will need to supply the individual maintaining the library with enough information to make and test the changes themselves. Here, we assume the maintainer of the library is the Analytical DBA (ADBA).

Modifying an Existing Extract

As such, the DDSFT may examine two possibilities for updating extractions. The DDSFT may need to modify an existing extract for a number of reasons, including a change to the original structure of the table, desiring a new type of transformation to an existing variable, or when new columns are added to the base table 245.

This type of change is the simpler of the two, because most new transformations can be created within the existing structure of the extract query code. If the DDSFT determines an existing extraction is to be modified 245, it may add a new column or adding a new type of transformation to an existing query 247. There may be instances where additional queries need to be created and integrated into the extract flow. In this case, all new basic variables should be done in the prefix_extract phase (where prefix is the table name), and then this basic logic should fed into the specific daily, weekly, and monthly extracts 247. Also, when adding new intermediate queries, you need to add a drop statement to the extract-specific cleanup macro.

New variables also may need to need to be added to the data dictionary, and to the internal var_lookup file. The var_lookup file draws from an internally referenced text file. This file will need to be updated with the new name and element number 247. The exact same name needs to be entered into the data dictionary, so users can reference the variable properly. The total number of variables per table also needs to be updated on the extract tab of the data dictionary. This element number should be used within the prefix_macro file to toggle on and off execution of the new statements.

Creating a New Extract

When a new source of data is to be added to the library of code, such as when new (e.g., workplace-related) tables are added to a schema, the DDSFT will determine that new extract will need to be added to the library 250. First, a denormalization plan will need to be created 252. What types of variables are users interested in? Does this table require joins to other tables to properly extract drivers? Both a well-populated data dictionary and data framework are necessary to understand the elements of the new table, and the interaction between this table and others.

After this operation, the logic to create the new drivers will need to be added to the code 252. This requires adding a new extract. This extract is done in five parts: (1) basic extract, (2) daily processing, (3) weekly processing, (4) monthly processing, and (5) cleaning up intermediate files. As much coding as possible should be done within the basic extract piece (1). This piece should lead directly into the different time aggregation logic (2)-(4). The structure of these parts depends on the native grain of the table in both time and unit. One way to tackle this part is to find a similar-style table in the existing extract, and copy the procedure used to create that. Each native time grain (event-based, monthly, update, or yearly) requires a different extraction algorithm.

In addition to the main extract code, number of elements will need to be updated. As is the case when we update an existing extract, we need to modify the data dictionary to include the new driver, and the variable lookup table (see above). Doing this will create new internal flags for the new table. In the main_body (wi_mrd macro) file, a new set of run logic will need to be created. Because nearly all logic depends on the user's variable definition table, nothing else needs to be done to add new code.

DDSFT Controller

FIG. 5 shows a block diagram illustrating embodiments of a DDSFT controller. In this embodiment, the DDSFT controller 501 may serve to aggregate, process, store, search, serve, identify, instruct, generate, match, and/or facilitate interactions with a computer through database information technology technologies, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DDSFT controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DDSFT controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 may be connected to the system bus. In another embodiment, the cryptographic processor and/or transceivers (e.g., ICs) 574 may be connected as either internal and/or external peripheral devices 512 via the interface bus I/O 508 (not pictured) and/or directly via the interface bus 507. In turn, the transceivers may be connected to antenna(s) 575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/b/g/n, Bluetooth 4.0 LE, FM, global positioning system (GPS) (thereby allowing DDSFT controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The dock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large mainframe computers, down to mini computers, servers, desktop computers, laptops, netbooks, tablets (e.g., iPads, Android and Windows tablets, etc.), mobile smartphones (e.g., iPhones, Android and Windows phones, etc.), wearable devise (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DDSFT controller and beyond through various interfaces. Should processing requirements dictate a greater amount speed and/or capacity, distributed processors (e.g., Distributed DDSFT), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DDSFT may be achieved by implementing a microcontroller such as CAST's R8051XC2 microcontroller; Intel's MCS 51 (i.e., 8051 microcontroller); and/or the like. Also, to implement certain features of the DDSFT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DDSFT component collection (distributed or otherwise) and/or features may be implemented via the microprocessor and/or via embedded components; e.g., via ASIC, coprocessor, DSP, FPGA, and/or the like. Alternately, some implementations of the DDSFT may be implemented with embedded components that are configured and used to achieve a variety of features or signal processing.

Depending on the particular implementation, the embedded components may include software solutions, hardware solutions, and/or some combination of both hardware/software solutions. For example, DDSFT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DDSFT features. A hierarchy of programmable interconnects allow logic blocks to be interconnected as needed by the DDSFT system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DDSFT may be developed on regular FPGAs and then migrated into a fixed version that more resembles ASIC implementations. Alternate or coordinating implementations may migrate DDSFT controller features to a final ASIC instead of or in addition to FPGAs. Depending on the implementation all of the aforementioned embedded components and microprocessors may be considered the "CPU" and/or "processor" for the DDSFT.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the DDSFT thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the DDSFT controller is accessible through remote clients 533*b* (e.g., computers with web browsers) by users 533*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed DDSFT), architectures may similarly be employed to pool, load balance, and/or otherwise decrease/increase the communicative bandwidth required by the DDSFT controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the DDSFT controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DDSFT controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the DDSFT controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the DDSFT controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the DDSFT component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the DDSFT controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&Ts UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DDSFT controller to communicate with other entities through a communications network 513. Various communication protocols may be used by the DDSFT controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DDSFT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DDSFT database 519, operating systems, other program components, user interfaces, Web browsers, and/or the like.

Access to the DDSFT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DDSFT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DDSFT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DDSFT enabled nodes. The combined application may be nugatory on systems employing standard Web browsers.

Mail Server

A mail server component 521 is a stored program component that is executed by a CPU 503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DDSFT.

Access to the DDSFT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DDSFT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DDSFT component to engage in secure transactions if so desired. The cryptographic component facilitates the secure accessing of resources on the DDSFT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DDSFT Database

The DDSFT database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DDSFT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DDSFT database is implemented as a data-structure, the use of the DDSFT database 519 may be integrated into another component such as the DDSFT component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-z:

An accounts table 519a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accounRestrictions, and/or the like;

A users table 519b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DDSFT);

An devices table 519c includes fields such as, but not limited to: deviceID, accountID, assetIDs, paymentIDs, deviceType, deviceName, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, device Preferences, deviceRestrictions, and/or the like;

An apps table 519d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 519e includes fields such as, but not limited to: assetID, accountID, userID, distributorAccountID, distributorPaymentID, distributorOnwerID, assetType, assetName, assetCode, assetQuantity, assetCost, assetPrice, assetManifactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthorizationCode, assetAccessPrivileges, assetPreferences, assetRestrictions, and/or the like;

A dataDictionary table 519f includes fields such as, but not limited to: dataDictionaryID, variableID, variableName, categoryID, categoryName, dataTableID, baseTableID, baseTableName, baseTableID, prefix, baseTableName, category, timeGrain, unitGrain, numberDerivedVariables, lookUpTableIDs, inudstryName, transactionCodes, affluenceFine, region, NAICSID, campaignCodesID, kitCodesID, marketDailyIDs, and/or the like;

An population table 519g includes fields such as, but not limited to: populationID, ipCharacter, acct_id, ip, plan_id, client_id_nbr, dc_market_segment_cd, business_unit, date, and/or the like;

An variable table 519h includes fields such as, but not limited to: variableID, variableName, driverID, driverName, categoryID, category, derivation, description, imputations, databaseTableID, databaseTableConnectorUser, databaseTableConnectorPassword, mode, modeling, scoring, nonprod, tag, schema, populationID, variableFile, userID, aggregation, populationID, pass, emailNotificationAddress, and/or the like;

An calendar table 519i includes fields such as, but not limited to: calendarID, unit_daynum, unit_weeknum, unit_monthnum, unit_dates, populationID, and/or the like;

A market_data table 519z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the DDSFT database may interact with other database systems. For example, employing a distributed database system, queries and data access by search DDSFT component may treat the combination of the DDSFT database, an integrated data security layer database as a single database entity.

In one embodiment, user programs may contain various user interface primitives, which may serve to update the DDSFT. Also, various accounts may require custom database tables depending upon the environments and the types of clients the DDSFT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-z. The DDSFT may be configured to keep track of various settings, inputs, and parameters via database controllers.

The DDSFT database may communicate to and/or with other components in a component collection, including itself, and/or facilities of the like. Most frequently, the DDSFT database communicates with the DDSFT component, other program components, and/or the like. The database may contain, retain, and provide information regarding other nodes and data.

The DDSFTs

The DDSFT component 535 is a stored program component that is executed by a CPU. In one embodiment, the DDSFT component incorporates any and/or all combinations of the aspects of the DDSFT that was discussed in the previous figures. As such, the DDSFT affects accessing, obtaining and the provision of information, services, transactions, and/or the like across various communications networks. The features and embodiments of the DDSFT discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DDSFT's features and facilities, and in many cases reduce the costs, energy consumption/requirements, and extend the life of DDSFT's underlying infrastructure; this has the added benefit of making the DDSFT more reliable. Similarly, many of the features and mechanisms are designed to be easier for users to use and access, thereby broadening the audience that may enjoy/employ and exploit the feature sets of the DDSFT; such ease of use also helps to increase the reliability of the DDSFT. In addition, the feature sets include heightened security as noted via the Cryptographic components 520, 526, 528 and throughout, making access to the features and data more reliable and secure The DDSFT transforms variable list request, population selection, base table transform extract data inputs, via DDSFT components (e.g., flag, population join, extract, transform components), into transformed, merged data outputs.

The DDSFT component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR; FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DDSFT server employs a cryptographic server to encrypt and decrypt communications. The DDSFT component may communicate to and/or with other components in a component collection, including itself, and/or facilities of the like. Most frequently, the DDSFT component communicates with the DDSFT database, operating systems, other program components, and/or the like. The DDSFT may contain, communicate, generate, obtain, and/or provide program component, system, user, and/or data communications, requests, and/or responses.

Distributed DDSFTs

The structure and/or operation of any of the DDSFT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DDSFT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse:

databases, data collections, data stores, structured data, and/or the like. Again, the desired configuration will depend upon the context, environment, and requirements of system deployment.

For example, in some implementations, the DDSFT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp!topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Database, Data Structure and Framework Transformer Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DDSFT individual and/or enterprise user, database configuration and/or relational model, data type, data transmission and/or network framework, syntax structure, and/or the like, various embodiments of the DDSFT, may be implemented that enable a great deal of flexibility and customization. For example, aspects of the DDSFT may be adapted for orthogonal pre-digested database table transformation operations. While various embodiments and discussions of the DDSFT have included database information technology, however, it is to be understood that the embodiments described herein may be readily configured and/or customized for a wide variety of other applications and/or implementations.

What is claimed is:

1. A processor-readable framework operably transformable data structure operations tool medium storing processor-executable components, the components, comprising:
   a component collection stored in the medium, including:
      a flag component;
      a population join component;
      an extract component; and
      a transformation component;
      wherein the flag component, stored in the medium, includes processor-issuable instructions to:
         obtain a variable request list by a user;
         generate a variable reference table datastructure;
         determine and apply flags for variables in the variable request list, contexts and transformations, to join and mark for processing the variable request list with the generated variable reference table datastructure, wherein the determination and application of flags is configured to allow for the creation of a binary true data table with table element flags, and wherein contexts include time periods for an aggregation grain suitable for joining with a base table datastructure;
      wherein the population join component, stored in the medium, includes processor-issuable instructions to:
         obtain a population input selection from the user;
         determine populations within specified time periods for an aggregation grain suitable for joining with the base table datastructure;
      wherein the extract component, stored in the medium, includes processor-issuable instructions to:
         obtain variables with applied flags from the flag component;
         extract raw data from the base table datastructure in at least two dimensions including units of time and units of aggregation;
      wherein the transformation component, stored in the medium, includes processor-issuable instructions to:
         obtain a time grain flags from the flag component;
         transform the user requested variable list requests, the population input selection, and base table datastructure transform extract data inputs into operably transformable merged data.

2. The medium of claim 1, wherein the user may supply a transformation instruction on the operably transformable merged data without creating new variables.

3. The medium of claim 1, wherein the units of aggregation may be at the plan/participant account level, an ip level, a plan level, a client level, a market segment level, and/or a business unit level.

4. A frameworking operations tool, comprising:
   a memory;
   a component collection in the memory, including:
      a transform component,
      an extract component;
      a population join component; and
      a flag component;
   a processor disposed in communication with the memory, and configured to issue a plurality of processing instructions from the component collection stored in the memory,
      wherein the processor issues instructions from the component collection, stored in the memory, to:
      extract raw data, using said extract component, from a base table datastructure in at least two dimensions including units of time and units of aggregation;
      compute flags, using said flag component, for tables, time units and variables, to join a user supplied variable definition file with a generated variable reference table datastructure to create a binary true data table datastructure with any of: table, element flags;
      determine, using said population join component, populations within specified time periods for an aggregation grain suitable for joining with said base table datastructure; and
      transform variable list requests, a population selection, and base table datastructure transform extract data inputs into transformed merged data outputs, using said transform component, to form a frameworking operations tool.

5. The apparatus of claim 4, wherein the units of aggregation are at the plan/participant account level, an ip level, a plan level, a client level, a market segment level, and/or a business unit level.

* * * * *